(12) United States Patent
Palmer

(10) Patent No.: US 11,199,364 B2
(45) Date of Patent: Dec. 14, 2021

(54) HEAT EXCHANGER

(71) Applicant: ROLLS-ROYCE plc, London (GB)

(72) Inventor: Chloe J. Palmer, Derby (GB)

(73) Assignee: Rolls-Royce PLC, London (GB)

( * ) Notice: Subject to any disclaimer, the term of this patent is extended or adjusted under 35 U.S.C. 154(b) by 75 days.

(21) Appl. No.: 16/716,873

(22) Filed: Dec. 17, 2019

(65) Prior Publication Data

US 2020/0224975 A1 Jul. 16, 2020

(30) Foreign Application Priority Data

Jan. 14, 2019 (GB) ...................................... 1900470

(51) Int. Cl.
 *F01P 3/00* (2006.01)
 *F28D 7/10* (2006.01)
 *F28D 21/00* (2006.01)

(52) U.S. Cl.
 CPC ...... *F28D 7/106* (2013.01); *F28D 2021/0026* (2013.01)

(58) Field of Classification Search
 CPC ..................... F28D 7/106; F28D 2021/0026
 USPC ........................................................ 165/51
 See application file for complete search history.

(56) References Cited

U.S. PATENT DOCUMENTS 10,690,232 B2 * 6/2020 Liou ..................... F04D 29/541
2004/0020213 A1 2/2004 Jones

FOREIGN PATENT DOCUMENTS

| DE | 102010043750 | 5/2012 |
|---|---|---|
| EP | 2336525 | 6/2011 |
| FR | 3028576 | 5/2016 |
| KR | 101270872 | 6/2013 |
| WO | 2014051678 | 4/2014 |

OTHER PUBLICATIONS

Response to Extended European Search Report from counterpart EP Application No. 19215667.7 dated Jun. 17, 2020, filed Dec. 18, 2020, 28 pgs.
European search report dated Jun. 3, 2020, issued in EP Patent Application No. 19215667.
Great Britain search report dated Jun. 26, 2019, issued in GB Patent Application No. 1900470.4.

* cited by examiner

*Primary Examiner* — Davis D Hwu
(74) *Attorney, Agent, or Firm* — Shumaker & Sieffert, P.A.

(57) ABSTRACT

The present disclosure concerns a heat exchanger, which may for example be utilised in a gas turbine engine or in other applications. Example embodiments include a heat exchanger comprising: an external surface for exchanging heat with an external fluid flow passing over the external surface; a first fluid passage extending through the heat exchanger from a first fluid inlet to a first fluid outlet, a first portion of the first fluid passage extending along the heat exchanger adjacent to the external surface for a first cooling fluid passing through the first fluid passage to exchange heat with the external fluid flow; and a second fluid passage extending through the heat exchanger from a second fluid inlet to a second fluid outlet located at the external surface for a second cooling fluid to pass from the second fluid inlet into the external fluid flow.

15 Claims, 3 Drawing Sheets

HEAT EXCHANGER

CROSS-REFERENCE TO RELATED APPLICATIONS

This specification is based upon and claims the benefit of priority from UK Patent Application Number 1900470.4 filed on 14 Jan. 2019, the entire contents of which are incorporated herein by reference.

BACKGROUND

Technical Field

The present disclosure concerns a heat exchanger, which may for example be utilised in a gas turbine engine for an aircraft or in other applications.

Description of the Related Art

A heat exchanger is a device used to transfer heat between fluids. Heat exchangers may be used to either cool or heat a fluid, and are therefore used for both heating and cooling applications. In cooling applications, heat exchangers may be used for example in various parts of an aircraft where continuous or temporary cooling is required, such as in regions of a gas turbine engine or other aircraft component where high temperatures may be experienced during operation that would otherwise compromise the integrity of the components being cooled.

One type of heat exchanger that may be particularly applicable to aerospace applications may be generally known as a surface heat exchanger. As opposed to typical conventional heat exchangers, which tend to use multiple plates and interleaving fluid flows to exchange heat between a pair of fluid flows, a surface heat exchanger has a single external surface to exchange heat between a fluid flowing within the heat exchanger and an external fluid flowing along the external surface. Such a surface heat exchanger may be planar or flat in form, or may be shaped to conform to the shape of the external surface.

A problem with existing surface heat exchangers is that the heat exchanger will need to be large enough to cope with heat loads that vary over the entire operating regime of the component to be cooled. These heat loads may, however, only experience peak heating for short periods of time, making the heat exchanger larger than is required for most of the time. This may impact overall efficiency as well as adding weight, both of which are important factors in aerospace applications.

SUMMARY

According to a first aspect there is provided a heat exchanger comprising:

an external surface for exchanging heat with an external fluid flow passing over the external surface;

a first fluid passage extending through the heat exchanger from a first fluid inlet to a first fluid outlet, a first portion of the first fluid passage extending along the heat exchanger adjacent to the external surface for a first cooling fluid passing through the first fluid passage to exchange heat with the external fluid flow; and a second fluid passage extending through the heat exchanger from a second fluid inlet to a second fluid outlet located at the external surface for a second cooling fluid to pass from the second fluid inlet into the external fluid flow.

By allowing a second cooling fluid to exit into the external fluid flow to be cooled, additional cooling of the external surface can be enabled when required through consumption of the second cooling fluid, allowing the heat exchanger to handle peak cooling loads for a smaller overall size or to handle higher peak loads for the same size.

A second portion of the first fluid passage may extend adjacent to the second fluid passage for exchanging heat between the first and second cooling fluids. The second cooling fluid can thereby extract heat from the first cooling fluid as it passes through the second fluid passage on the way to the second fluid outlet, further enhancing the cooling capacity of the heat exchanger when the second cooling fluid is flowing.

The first and second portions of the first fluid passage may be thermally insulated from each other by a thermally insulating layer extending parallel to the external surface and between the first and second portions of the first fluid passage. The insulating layer prevents heat being transferred between the first and second portions of the first fluid passage, thereby keeping the temperature of the first fluid at the first outlet down.

The heat exchanger may further comprise a first cooling fluid pump configured to pump the first fluid through the first fluid passage from the first fluid inlet to the first fluid outlet.

The first fluid may be in a gaseous state.

The heat exchanger may further comprise a second cooling fluid pump configured to pump the second cooling fluid in a liquid state through the second fluid passage.

The first or second cooling fluid pumps may for example be in the form of a centrifugal pump, a screw pump or a fixed displacement pump. A screw or piston pump may be particularly applicable for the second cooling fluid pump when the second cooling fluid is in liquid form.

The second fluid outlet may comprise a plurality of orifices extending along a leading edge of the external surface.

According to a second aspect there is provided a gas turbine engine for an aircraft, in which a bypass duct of the gas turbine engine comprises a heat exchanger according to the first aspect, the external surface of the heat exchanger forming a bypass airflow surface of the bypass duct.

According to a third aspect there is provided a method of operating a heat exchanger, the heat exchanger comprising:

an external surface for exchanging heat with an external fluid flow passing over the external surface;

a first fluid passage extending through the heat exchanger from a first fluid inlet to a first fluid outlet, a first portion of the first fluid passage extending along the heat exchanger adjacent to the external surface for a first cooling fluid passing through the first fluid passage to exchange heat with the external fluid flow; and a second fluid passage extending through the heat exchanger from a second fluid inlet to a second fluid outlet located at the external surface for a second cooling fluid to pass from the second fluid inlet into the external fluid flow, the method comprising:

flowing the first fluid through the first fluid passage to exchange heat with the external fluid flow; and flowing a second fluid through the second fluid passage and into the external fluid flow via the second fluid outlet to further exchange heat with the external fluid flow.

The features of the heat exchanger according to the third aspect may comprise any one or more features described as part of the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
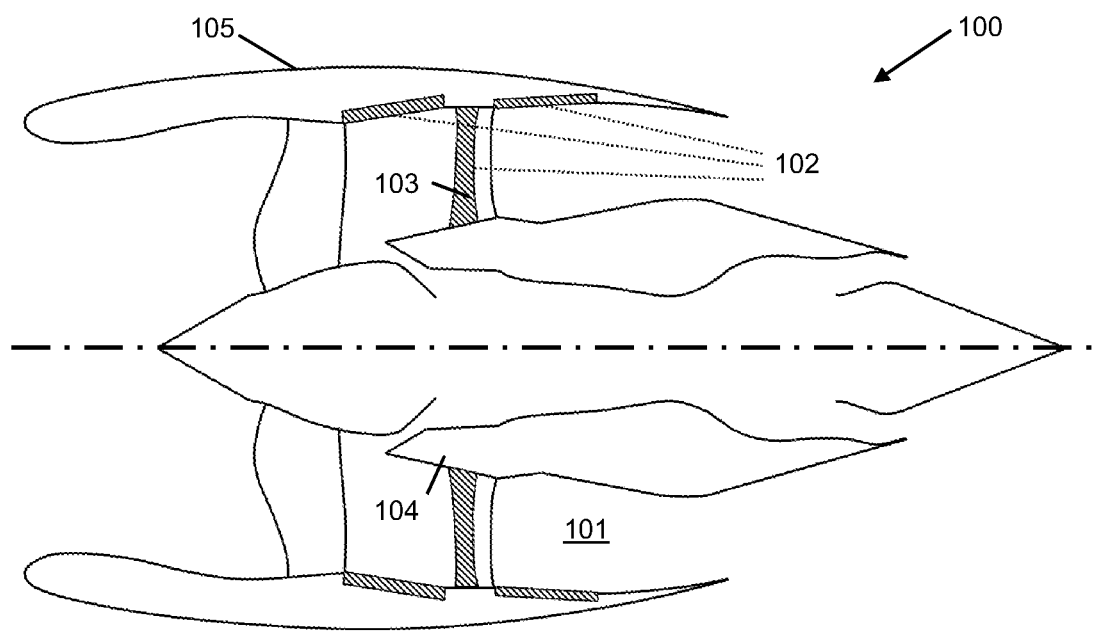
FIG. 1 is a schematic sectional view of an example gas turbine engine for an aircraft.

FIG. 1 illustrates a schematic sectional view of an example gas turbine engine 100. In the bypass duct 101 of the engine 100, heat exchangers may be provided in one or more positions 102, for example along the inner or outer surfaces of the bypass duct 101 or on a surface of a structural supporting outlet guide vane 103 connecting the engine core 104 to the outer nacelle 105. Different types of heat exchangers may be employed, with matrix type heat exchangers being used in some cases. Flat surface heat exchangers having thermally conductive plates fitted to a surface in the bypass flow, either before or after the outlet guide vanes 103, may alternatively be used. An advantage of using a flat surface heat exchanger is that, although it may have a lower performance than a matrix heat exchanger of similar size, it can offer close to zero additional drag, thereby maintaining aerodynamic performance of the engine 100. Increasing demands, however, have made flat surface heat exchangers less viable as heat loads increase due to features such as power gearboxes and increasing electrification within engines and onboard the aircraft.

Cooling loads on the ground are typically higher than at altitude, due to higher thrust requirements using slower, hotter air as a heatsink, compared with lower thrust and higher cooler airspeed at altitude. This means that, whilst a flat surface heat exchanger can be used effectively at altitude, it may be ruled out when designing an engine due to the heat exchanger not being sufficiently effective when operating the engine on the ground or in low level flight.

The above problem can be addressed through the use of a hybrid fluid heat exchanger. For operation on the ground and in take-off or low-level flight, water or another type of liquid coolant can be pumped through the heat exchanger in an open loop fashion to exit through orifices that open at a leading edge of the external surface of the heat exchanger. The liquid coolant then is allowed to vaporise and flow along with the airflow. To further enhance the cooling effect, the liquid coolant can be flowed in a counter-current flow to the air direction in a first thermal zone. When the aircraft reaches a suitable altitude and thrust setting, the open loop coolant flow can be stopped and the heat exchanger operated using only the bypass air coolant flow. This increases the heat exchanger duty temporarily for as long as the liquid open loop coolant is being used.

Figure 2:
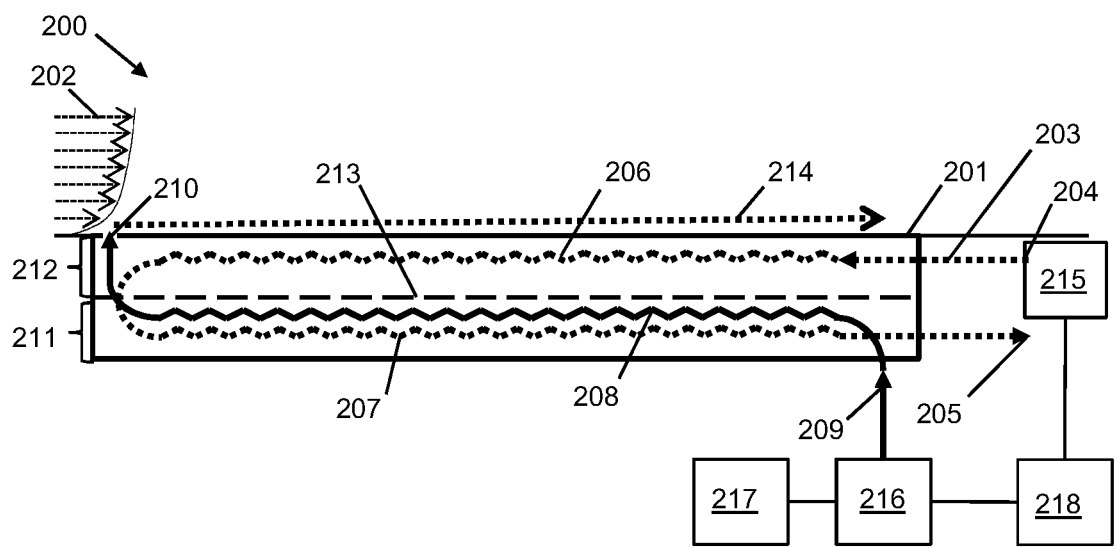
FIG. 2 is a schematic sectional view of an example heat exchanger.

FIG. 2 illustrates an example heat exchanger 200, in which an external surface 201 of the heat exchanger 200 exchanges heat with an external fluid flow 202 passing over the external surface 201. The external fluid flow 202 may for example be a bypass flow of a gas turbine engine. A first fluid passage 203 extends through the heat exchanger 200 from a first fluid inlet 204 to a first fluid outlet 205. A first portion 206 of the first fluid passage 203 extends along the heat exchanger 200 adjacent to the external surface for a first cooling fluid to pass through and exchange heat with the external fluid flow 202. The first cooling fluid passes through the first portion 206 of the first fluid passage 203 in a direction that opposes the direction of external fluid flow 202 across the external surface 201.

A second fluid passage 208 extends through the heat exchanger 200 from a second fluid inlet 209 to a second fluid outlet 210. The second fluid outlet 210 is located at the external surface 201, so that a second cooling fluid may pass from the second fluid inlet 209 into the external fluid flow 202, which provides additional cooling as it travels along the external surface 201 along with the external fluid flow 202. The second cooling fluid is therefore preferably a liquid, which enables the latent heat of vaporisation to be used to provide cooling as the liquid is vaporised upon exiting the second fluid passage 208 at the second fluid outlet 210. FIG. 2 illustrates the second cooling fluid flow 214 flowing along the external surface 201 within the external fluid flow 202.

The example heat exchanger 200 in FIG. 2 is divided into two thermal zones 211, 212, which may be separated by a thermally insulating layer 213 extending parallel to the external surface 201 and between the first and second portions 206, 207 of the first fluid passage 204. In a first thermal zone 211 the second portion 207 of the first fluid passage 203 extends adjacent the second fluid passage 208 for exchanging heat between the first and second cooling fluids. In this zone 211 the specific heat capacity of the second cooling fluid, which is in the form of a liquid, is used. In the second thermal zone 212 the latent heat of vaporisation of the second cooling fluid, along with the incoming airflow 202, provides further cooling. When not required, the second cooling fluid can be turned off, and the bypass air 202 alone may be sufficient for cooling the first cooling fluid as it passes through the first portion 206 of the first cooling fluid passage 203.

The heat exchanger 200 comprises a first cooling fluid pump 215 configured to pump the first fluid, which is in a gaseous state, through the first fluid passage 203 from the first fluid inlet 204 to the first fluid outlet 205. A second fluid pump 216 is arranged to pump the second cooling fluid into the second fluid inlet 209. The second cooling fluid may be drawn from a cooling fluid tank 217. Operation of the first and second pumps 215, 216 may be controlled by a controller 218, which may for example form part of an overall controller for a gas turbine engine.

Figure 3:
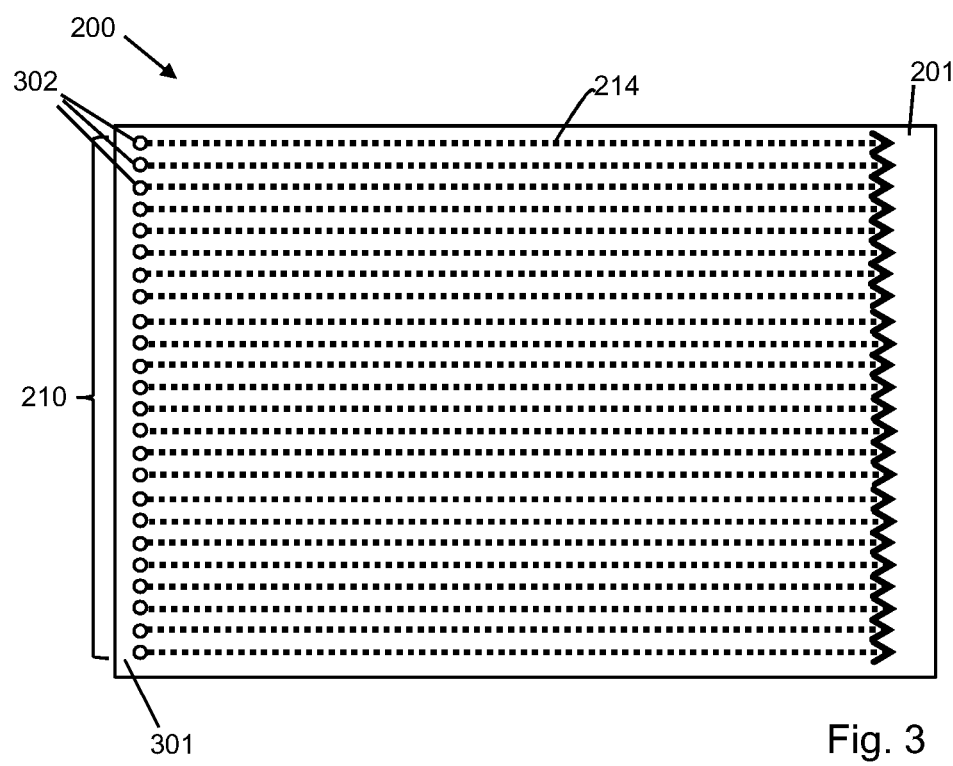
FIG. 3 is a schematic plan view of the example heat exchanger of FIG. 2.

FIG. 3 illustrates a schematic plan view of the heat exchanger 200 of FIG. 2, with the second fluid outlet 210 comprising a plurality of orifices 302 extending along a leading edge 301 of the external surface 201 of the heat exchanger 200. Each orifice 320 corresponds to an outlet of one of a corresponding plurality of second fluid passages extending along the heat exchanger 200. A corresponding plurality of first fluid passages (not shown in FIG. 3) are also provided. Other orifices and corresponding fluid passages may also be provided at different positions on the external surface 201.

Figure 4:
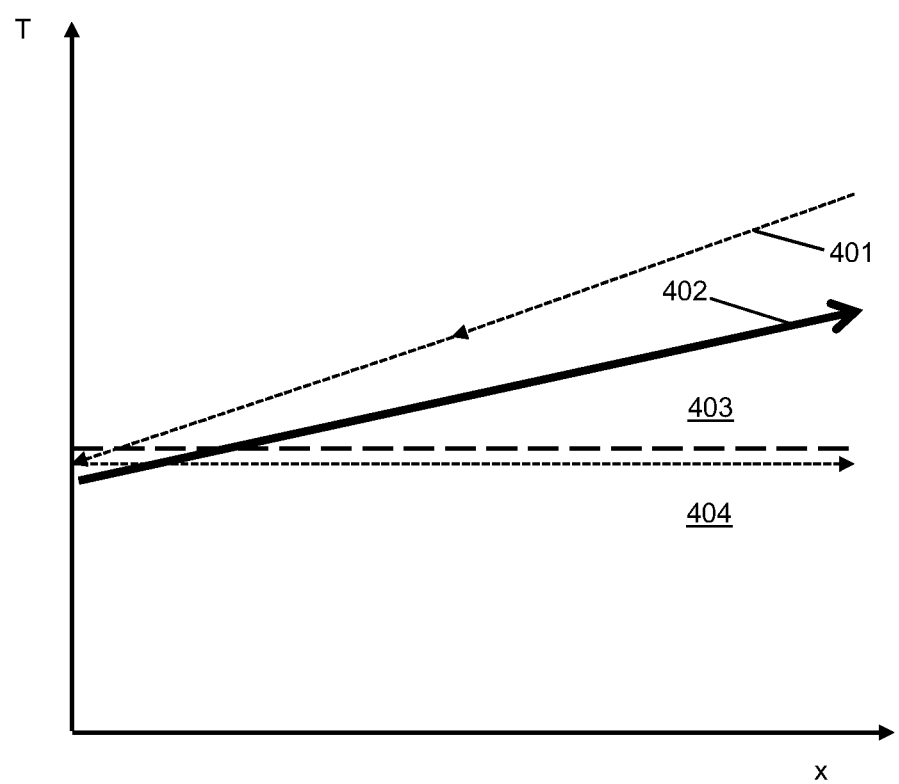
FIG. 4 is a schematic diagram of temperature as a function of position along an example heat exchanger of conventional type.
Figure 5:
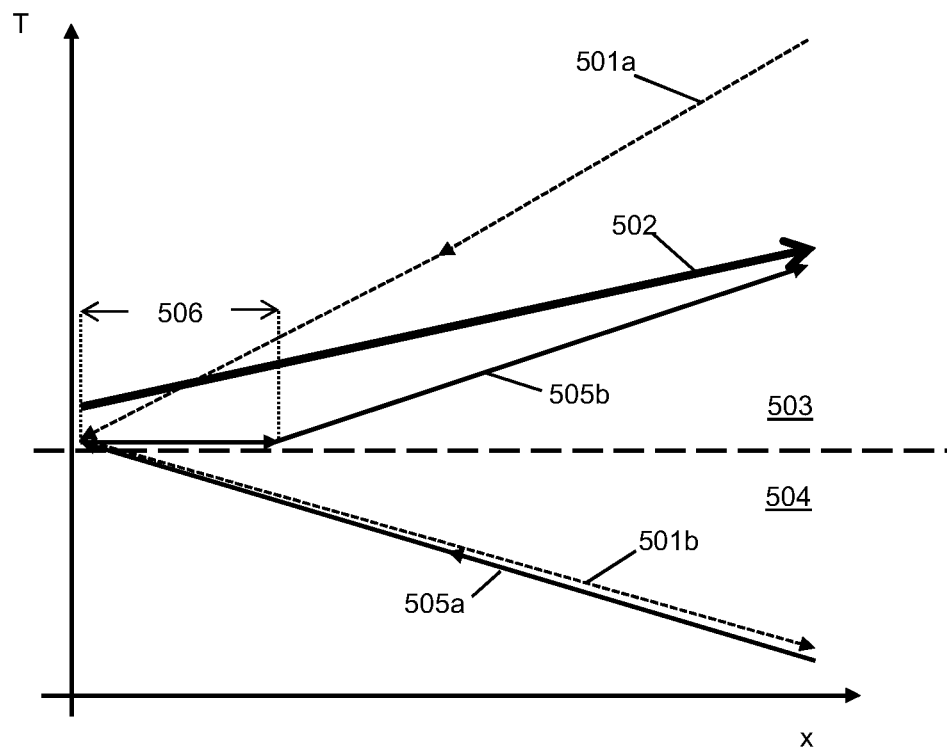
FIG. 5 is a schematic diagram of temperature as a function of position along an example heat exchanger according to the present disclosure.

FIGS. 4 and 5 illustrate schematically variations in temperature, T, as a function of position, x, along example heat exchangers. FIG. 3 shows the variation in temperature 401 for a cooling fluid as it passes along a fluid passage in a direction opposing the direction of flow of the external fluid flow. The temperature 402 of the external fluid flow increases in the direction of flow, while the temperature 401 of the cooling fluid decreases as its heat is transferred to the external fluid flow. The cooling fluid then changes direction and passes from a first thermal zone 403 in thermal contact with the external fluid flow into a second thermal zone 404 that is thermally insulated from the external fluid flow. In the second thermal zone 404 the temperature of the cooling fluid stays approximately constant. These variations in temperature apply to a heat exchanger of the conventional type, as well as to a heat exchanger of the type illustrated herein when the second cooling fluid flow is not operational.

FIG. 5 illustrates the variations in temperature for an example heat exchanger of the type described herein with the second cooling fluid in operation.

As with the conventional heat exchanger, in the first thermal zone 503 the temperature 501a of the cooling fluid, which in this case is a first cooling fluid, decreases as it passes along the first fluid passage in a direction opposing the direction of flow of the external fluid flow, while the temperature 502 of the external fluid flow increases in the direction of flow. As the first and second fluid passages are adjacent one another in the second thermal zone 504 the temperature 501b of the first cooling fluid continues to decrease as the temperature 505a of the second cooling fluid increases. Once the second cooling fluid reaches the outlet on the external surface of the heat exchanger, the latent heat of vaporisation provides further cooling over a vaporising region 506, before the temperature 505b continues to rise along with the temperature 502 of the external fluid flow.

Figure 6:
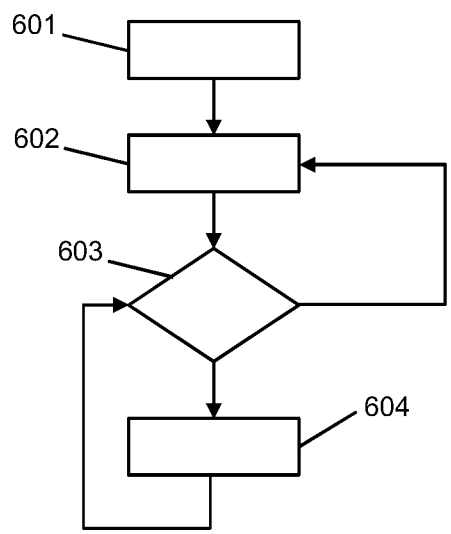
FIG. 6 is a schematic diagram illustrating a method of operating a heat exchanger according to the present disclosure.

An example method of operating a heat exchanger of the type described herein is shown schematically in FIG. 6. In a first step 601 the process starts, and in step 602 fluid is pumped through the first fluid passage. In step 603, if additional cooling is required the process proceeds to step 604 where cooling fluid is additionally pumped through the second fluid passage. If additional cooling continues to be required, fluid continues to pump through the second fluid passage along with cooling fluid through the first fluid passage. Once additional cooling is no longer required, the process reverts to step 602 and fluid stops being pumped through the second fluid passage, reverting to fluid passing only through the first cooling fluid passage. The decision of whether to additionally pump fluid through the second cooling fluid passage may be taken depending on factors such as a thrust demand on the gas turbine engine in which the heat exchanger is installed, or may be based on a temperature reading of a component requiring additional cooling.

Other embodiments could include the use of one or more fluids as open loop performance enhancers, such that multiple design points can be achieved. Different fluids can be used such as hot fluids or cryogenic fluids. Fluids other than air could be used in the bypass. Placement of the heat exchanger could vary from bypass ducts to other positions such as on aircraft wings, podded nacelles, propeller pods, empennage, fuselage, canards, or other region of aircraft fluid flow that may bring about a benefit.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A heat exchanger for a gas turbine engine of an aircraft, the heat exchanger comprising:
   an external surface for exchanging heat with an external fluid flow passing over the external surface;
   a first fluid passage extending through the heat exchanger from a first fluid inlet to a first fluid outlet, a first portion of the first fluid passage extending along the heat exchanger adjacent to the external surface for a first cooling fluid passing through the first fluid passage to exchange heat with the external fluid flow; and
   a second fluid passage extending through the heat exchanger from a second fluid inlet to a second fluid outlet located at the external surface for a second cooling fluid to pass from the second fluid outlet into the external fluid flow, wherein a second portion of the first fluid passage extends adjacent to the second fluid passage for exchanging heat between the first and second cooling fluids, and wherein at least the second fluid is a liquid when transiting the second fluid passage.

2. The heat exchanger of claim 1, wherein the first and second portions of the first fluid passage are thermally insulated from each other by a thermally insulating layer extending parallel to the external surface and between the first and second portions of the first fluid passage.

3. The heat exchanger of claim 1, further comprising a first cooling fluid pump configured to pump the first fluid through the first fluid passage from the first fluid inlet to the first fluid outlet.

4. The heat exchanger of claim 3, wherein the first fluid is in a gaseous state.

5. The heat exchanger of claim 3, comprising a second cooling fluid pump configured to pump the second cooling fluid in a liquid state through the second fluid passage.

6. The heat exchanger of claim 1, wherein the second fluid outlet comprises a plurality of orifices extending along a leading edge of the external surface.

7. A gas turbine engine for an aircraft, in which a bypass duct of the gas turbine engine comprises a heat exchanger according to claim 1, the external surface of the heat exchanger forming a bypass airflow surface of the bypass duct.

8. A method of operating a heat exchanger for a gas turbine engine of an aircraft, the heat exchanger comprising: an external surface for exchanging heat with an external fluid flow passing over the external surface; a first fluid passage extending through the heat exchanger from a first fluid inlet to a first fluid outlet, a first portion of the first fluid passage extending along the heat exchanger adjacent to the external surface for a first cooling fluid passing through the first fluid passage to exchange heat with the external fluid flow; and a second fluid passage extending through the heat exchanger from a second fluid inlet to a second fluid outlet located at the external surface for a second cooling fluid to pass from the second fluid inlet into the external fluid flow, wherein a second portion of the first fluid passage extends adjacent to the second fluid passage for exchanging heat between the first and second cooling fluids, and wherein at least the second fluid is a liquid when transiting the second fluid passage, the method comprising:

flowing the first fluid through the first fluid passage to exchange heat with the external fluid flow; and flowing the second fluid comprising the liquid through the second fluid passage and into the external fluid flow via the second fluid outlet to further exchange heat with the external fluid flow.

9. The method of claim 8, wherein the first and second portions of the first fluid passage are thermally insulated from each other by a thermally insulating layer extending parallel to the external surface and between the first and second portions of the first fluid passage.

10. The method of claim 8, wherein the step of flowing the first fluid through the first fluid passage comprises pumping the first fluid with a first cooling fluid pump.

11. The method of claim 10, wherein the first fluid is in a gaseous state.

12. The method of claim 10, wherein the step of flowing a second fluid through the second fluid passage comprises pumping the second cooling fluid in a liquid state using a second cooling fluid pump.

13. The method of claim 8, wherein the second fluid outlet comprises a plurality of orifices extending along a leading edge of the external surface.

14. A heat exchanger comprising:

an external surface for exchanging heat with an external fluid flow passing over the external surface;

a first fluid passage extending through the heat exchanger from a first fluid inlet to a first fluid outlet, a first portion of the first fluid passage extending along the heat exchanger adjacent to the external surface for a first cooling fluid passing through the first fluid passage to exchange heat with the external fluid flow; and a second fluid passage extending through the heat exchanger from a second fluid inlet to a second fluid outlet located at the external surface for a second cooling fluid to pass from the second fluid outlet into the external fluid flow, wherein a second portion of the first fluid passage extends adjacent to the second fluid passage for exchanging heat between the first and second cooling fluids, and wherein the first and second portions of the first fluid passage are thermally insulated from each other by a thermally insulating layer extending parallel to the external surface and between the first and second portions of the first fluid passage.

15. A method of operating a heat exchanger, the heat exchanger comprising: an external surface for exchanging heat with an external fluid flow passing over the external surface; a first fluid passage extending through the heat exchanger from a first fluid inlet to a first fluid outlet, a first portion of the first fluid passage extending along the heat exchanger adjacent to the external surface for a first cooling fluid passing through the first fluid passage to exchange heat with the external fluid flow; and a second fluid passage extending through the heat exchanger from a second fluid inlet to a second fluid outlet located at the external surface for a second cooling fluid to pass from the second fluid inlet into the external fluid flow, wherein a second portion of the first fluid passage extends adjacent to the second fluid passage for exchanging heat between the first and second cooling fluids, and wherein the first and second portions of the first fluid passage are thermally insulated from each other by a thermally insulating layer extending parallel to the external surface and between the first and second portions of the first fluid passage, the method comprising:

flowing the first fluid through the first fluid passage to exchange heat with the external fluid flow; and flowing the second fluid through the second fluid passage and into the external fluid flow via the second fluid outlet to further exchange heat with the external fluid flow.

* * * * *